United States Patent [19]

Shiga et al.

[11] E Patent Number: Re. 31,955

[45] Reissued Date of Patent: Jul. 30, 1985

[54] FLASHING CONSTRUCTION FOR A CURTAIN WALL

[75] Inventors: Yoshinobu Shiga; Ryusuke Kage; Masakatsu Iwata, all of Tokyo, Japan

[73] Assignee: Nippon Light Metal Company, Limited, Tokyo, Japan

[21] Appl. No.: 510,980

[22] Filed: Jul. 5, 1983

Related U.S. Patent Documents

Reissue of:

[64] Patent No.: 4,276,729
Issued: Jul. 7, 1981
Appl. No.: 65,285
Filed: Aug. 9, 1979

[51] Int. Cl.[3] ..... E06B 7/14
[52] U.S. Cl. ..... 52/209; 52/303
[58] Field of Search ..... 52/235, 209, 303, 302

[56] References Cited

U.S. PATENT DOCUMENTS

| | | | |
|---|---|---|---|
| 2,949,981 | 8/1960 | Ferrell | 52/303 X |
| 2,976,970 | 3/1961 | Toney | 52/303 X |
| 3,362,123 | 1/1968 | Geyser | 52/209 X |
| 3,488,906 | 1/1970 | Brooks | 52/235 X |
| 3,844,077 | 10/1974 | Vance | 52/209 |
| 3,858,375 | 1/1975 | Silvernail | 52/290 X |
| 4,050,201 | 9/1977 | Hubbard et al. | 52/97 |
| 4,055,923 | 11/1977 | Biebuyck | 52/302 X |

*Primary Examiner*—Carl D. Friedman
*Attorney, Agent, or Firm*—McAulay, Fields, Fisher, Goldstein & Nissen

[57] ABSTRACT

A flashing construction for a curtain wall utilizing The Equal Pressure Principle. Said flashing construction comprises a plurality of vertical mullions disposed parallel to each other and panels being mounted between said mullions. An enclosed vertical space is formed between the mullion and the panel; also, intake ports to the open air are provided on the mullion, whereby said vertical space is connected to the open air through said intake ports. As a result, the pressure in said vertical space is equalized to that of the open air.

12 Claims, 11 Drawing Figures

FLASHING CONSTRUCTION FOR A CURTAIN WALL

Matter enclosed in heavy brackets [ ] appears in the original patent but forms no part of this reissue specification; matter printed in italics indicates the additions made by reissue.

BRIEF DESCRIPTION OF THE INVENTION

The present invention relates to a construction of a building, and is particularly concerned with an improved flashing construction for a curtain wall utilizing The Equal Pressure Principle, by which is meant, when raining with a gale-force winds, leakage of rain water through the frame work of the curtain wall toward the inside of the same is caused by the difference between the pressures prevailing in the open air outside the curtain wall and within the frame work of the curtain wall. It should be noted that, in such case, the pressure in the open air is higher than the pressure within the curtain wall. Thus, if the pressure within the curtain wall is established and maintained substantially equal to the pressure in the open air, leakage of the rain water toward the inside of the curtain wall can be fully prevented.

BRIEF DESCRIPTION OF THE PRIOR ART

The curtain wall of the building comprises a plurality of vertical mullions fixed on the outer surface of the building and are arranged parallel to each other at a predetermined distance, a plurality of horizontal transoms connected between said adjacent vertical mullions and arranged parallel to each other, and a plurality of panels, for example, panes, being mounted in the frame works constructed by the mullions and the transoms. There have been several designs proposed for the flashing constructions of the curtain wall utilizing The Equal Pressure Principle. Such known constructions can comprise, for example, intake ports for the open air provided on the horizontal transoms, through which ports the open air is introduced into the space within the curtain wall. As a result the pressures prevailing in the open air and within the curtain wall are equalized. However, it can be easily recognized that, since the outer surface area of the mullions is larger than that of the transoms, larger total areas of the intake ports can be obtained on said mullions than on the transoms, to accomplish the rapid equilibrium of such pressures.

The disadvantage of the above-described construction of the prior art resides in the fact that it is difficult to prevent the invasion of rain water while introducing open air into the mullion, and if rain water enters into the mullion, said water must be thoroughly expelled from the mullion. For these reasons, the prior art curtain wall has disadvantageously become a very complicated construction. Furthermore, the mullion is large in length and, consequently, is heavy in weight. Therefore, manufacturing the mullions so as to provide drain ports, and the like, is extremely difficult.

OBJECTS OF THE INVENTION

Accordingly, it is the general object of the present invention to obviate the aforementioned disadvantages by providing an improved flashing construction for a curtain wall.

It is another object of the present invention to provide a flashing construction for a curtain wall having an enclosed vertical space formed between the mullion and the panel, said vertical space being connected with the open air. Thereby, the pressure within the curtain wall is equalized with that of the open air and, consequently, leakage of the rain water through the curtain wall can be prevented.

It is a further object of the present invention to provide a flashing construction for a curtain wall having an enclosed vertical space formed among the mullion, the panel, the bead and the extra bead, and having an enclosed horizontal space formed between the transom and the panel, said vertical space and said horizontal space being connected with each other; intake ports being provided on said extra bead, whereby said vertical space and said horizontal space are connected to the open air by means of said intake ports.

It is a still further object of the present invention to provide a flashing construction for a curtain wall having a cover plate positioned over the intake ports provided on the mullion, by which the invasion of the rain water into said intake ports can be prevented.

Other objects of the present invention will become obvious from the embodiments described hereinafter or indicated in the appended claims. Furthermore, various advantages not referred to herein will certainly become apparent when the present invention is carried out by one skilled in the art.

BRIEF DESCRIPTION OF THE DRAWINGS

Preferred embodiments of the invention will now be described in detail with reference to the accompanying drawings, wherein the same reference numerals are used to designate similar parts throughout the several views, in which.

Figure 3:
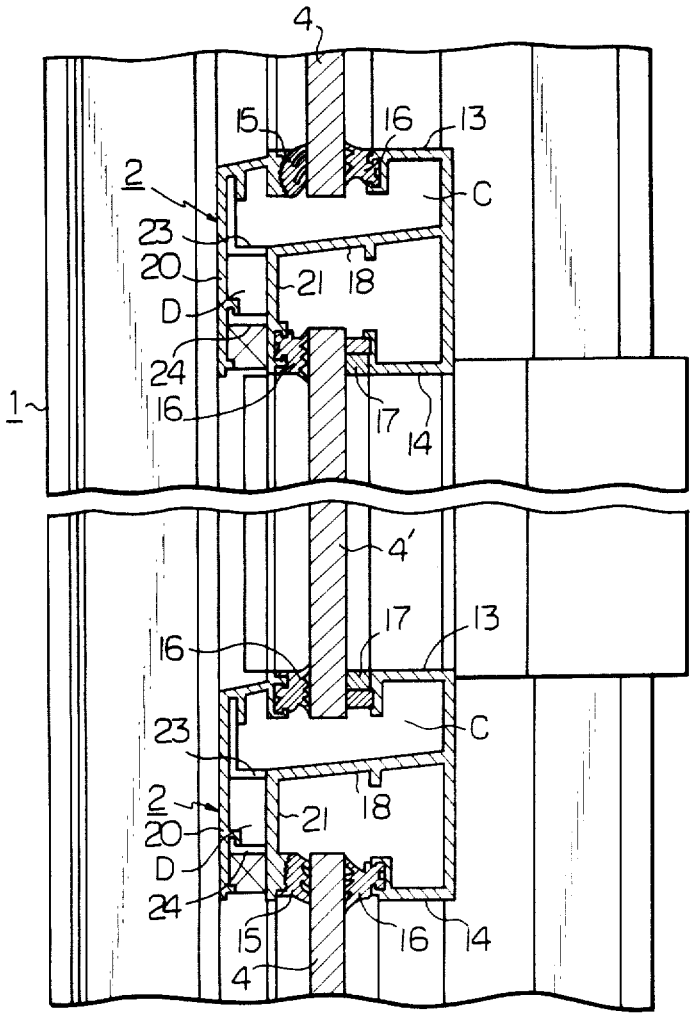
FIG. 3 is an enlarged cross-sectional view taken substantially on line III—III of FIG. 1.
Figure 4:
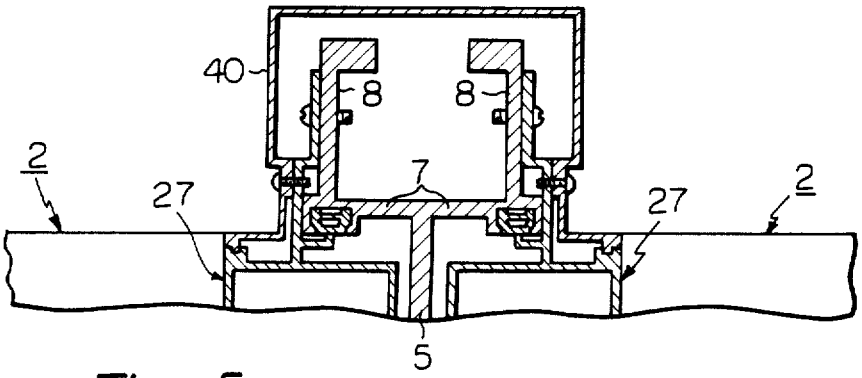
FIG. 4 is an enlarged cross-sectional view taken substantially on line IV—IV of FIG. 1.

With regard to FIGS. 3 and 4, many parts of the curtain wall are not shown in order to reveal important details.

DESCRIPTION OF THE PREFERRED EMBODIMENTS

Figure 1:
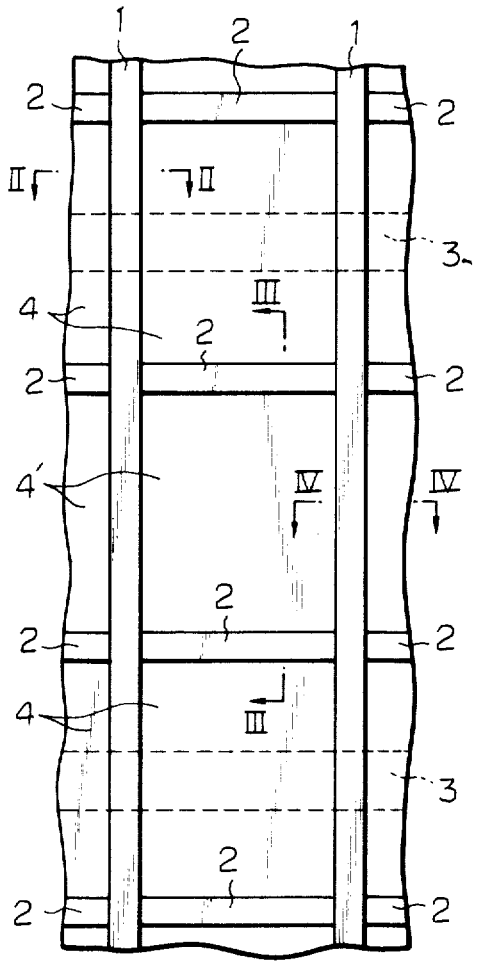
FIG. 1 is a partial front view showing an embodiment of a flashing construction for a curtain wall according to the present invention.

Referring to the attached drawings, FIG. 1 shows a general view of a flashing construction for a curtain wall according to the present invention. A plurality of vertical mullions or vertical members (1, 1 . . . ) are disposed parallel to each other at a predetermined distance on the outside surface of the building (not shown). Between said adjacent vertical mullions (1, 1 . . . ) a plurality of horizontal transoms or horizontal members (2, 2 . . . ) are also disposed parallel to each other and are connected between the mullions (1, 1) at right angles. Within the openings of the elongated rectangular-shaped frameworks defined by the mullions and the transoms, a panel is mounted. A typical arrangement of the floor 3, i.e. the opening in the spandrel portion is employed for receiving a solid panel 4, for example, a thin metal sheet, a cloudy pane or the like, while the opening spaced apart from the end of the floor 3 is employed for receiving a transparent panel, for example, a clear pane, a movable window etc.

Figure 2:
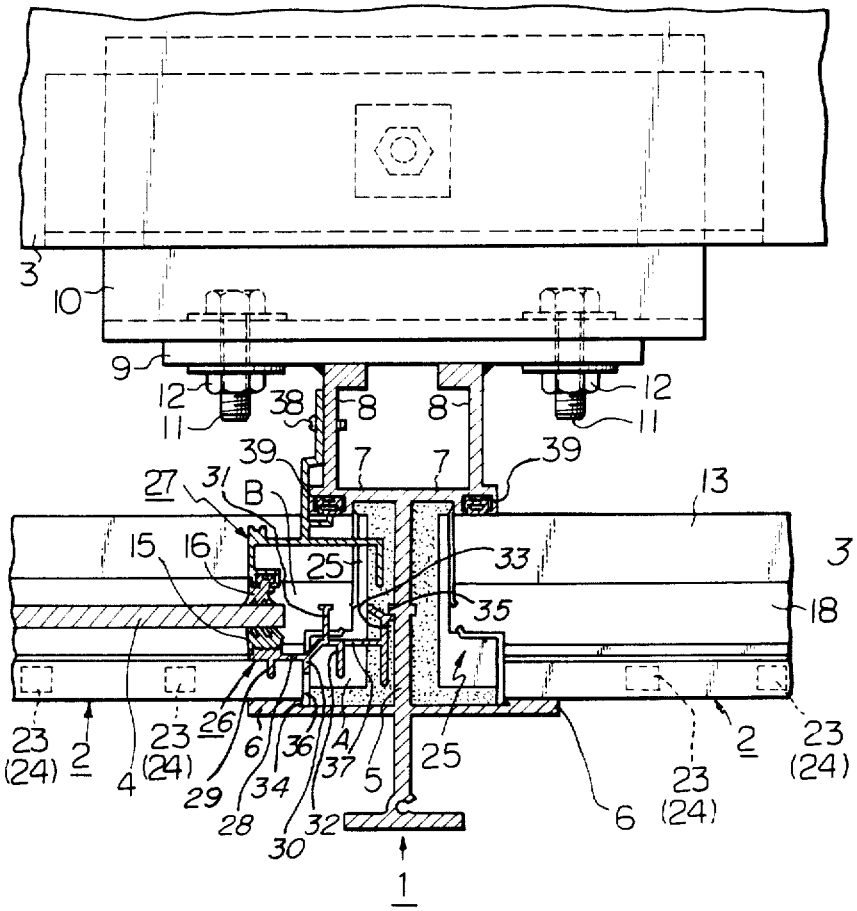
FIG. 2 is an enlarged cross-sectional view taken substantially on line II—II of FIG. 1.

As shown in FIG. 2, the T-shaped mullion 1 has an elongated body portion 5, exterior flange portions (6, 6) and interior flange portions (7, 7), which are horizontally extending from both sides of said body portion 5, and longitudinally extending legs (8, 8) protruding from said interior flanges, respectively. Two horizontally extending grooves for receiving one end of the respective horizontal transom are formed among each of the two opposed flanges (6, 7) and the side of body portion 5. The legs (8, 8) are secured by means of welding or the like to the bracket 9 at the corresponding place at the position of the spandrel. In addition, said bracket 9 is secured to the anchor member 10 by means of bolts 11 and nuts 12. The anchor member is firmly secured to the floor 3 through a suitable fixing means.

As shown in FIG. 3, the horizontal transom 2 is made substantially in the form of a rectangular hollow tube. The upper and lower walls (13, 14) of the transom 2 are provided with mounting grooves for the panel. Said mounting groove on the upper wall 13 is employed for receiving the lower end portion of the panel (4 or 4'), while the mounting groove on the lower wall 14 is employed for receiving the upper end portion of the panel (4 or 4'). The numerals 15, 16 and 17 denotes a tightening compound. In the inner central portion of the transom 2 there is provided an outwardly downwardly inclined partition wall 18 protruding from the back wall of the trasom 2. As a result, a horizontally extending space C throughout length of the transom 2 is formed between the upper wall 13 and the partition wall 18. A vertical partition wall 21 is vertically downwardly extended from the leading edge of the partition wall 18 so as to be spaced apart at a small distance from the front wall 20 of the transom 2. A small space D having an opening throughout the length of the transom 2 at the bottom thereof is formed between the vertical partition wall 21 and the front wall 29. Said opening D connects with the open air outside the panel 4 or 4'. In the horizontal partition wall 18 and between the spaces C and D, a plurality of first drain ports (23, 23 . . . ) are disposed at suitable intervals in the lengthwise direction of the transom 2. An auxilial horizontal wall is protruded from the midportion of the vertical partition wall 21, which divides said small space D into two separated portions. A plurality of second drain ports (24, 24 . . . ), corresponding to said first drain ports (23, 23 . . . ), are disposed in the auxilial horizontal wall.

Returning to FIG. 2, in assembling the above-described curtain wall, firstly both ends of the transom 2 are brought into the mounting grooves for the transom of the adjacent mullions (1, 1), and jointed to the respective mullion by using suitable brackets (not shown). In turn, between the mullion 1 and each end portion of the transom 2 is filled with a calking compound, and catch pans (25, 25) are fixed to the top surface of said each end portion. A bead 27 is provided immediately inside of the interior flange 7, which bead abuts against the upper and lower transoms (2, 2) at the upper and lower ends thereof. An extra bead 26 is provided immediately inside of the exterior flange 6, which extra bead abuts against the upper and lower transom (2, 2) at the upper and lower ends thereof. Thus, the mounting groove for the panel is formed between said beam 27 and said extra bead 26. In said mounting groove each one of the side portions of the panel (4 or 4') is mounted with the aid of a suitable tightening compound.

As shown in FIG. 2, said extra bead 26 has a thin body wall 28 and auxilial walls (29, 30, 31, 32, 33) protruding from both sides of said body wall. The auxilial wall 30 is engaged with the engaging face 34 of the exterior flange 6, while the auxilial wall 33 is engaged with the engaging face 35 of the body portion 5. Thus, the first vertical space A extending throughout the length of the extra bead is formed between the extra bead 26 and the mullion 1, and the second vertical space B extending throughout the length of the extra bead is formed among the extra bead 26, the mullion 1, the bead 27 and the panel (4 or 4'). A plurality of first intake ports 36 for the open air are provided in the wall 30 so as to connect first vertical space A with the open air, and a plurality of second intake ports 37 are provided in the body wall so as to connect the second vertical space B with the open air through the first vertical space A.

In FIG. 2, the numeral 38 denotes machine screws for fixing the bead 27 with the mullion 1, 39 deontes a sealing compound for sealing between the bead 27 and the mullion 1.

As shown in FIG. 4, the legs (8, 8) forming a channel-shaped portion of the mullion 1 are covered by a cover plate 40.

The function of the flashing construction of the present invention is as follows:

The open air is introduced into the spaces A, B, C and D through the intake ports (36, 37) and the drain ports (23, 24), then the pressures prevailing in the spaces A, B, C and D become equal to that of the open air instantaneously. Properly enlarged said drain ports (23, 24) may be employed for positive introduction of the open air therethrough. The open air is introduced through the first intake ports 36 in to the first vertical space A, and through the second intake ports 37 into the second vertical space B, so that the pressures prevailing in the spaces A and B are equalized with each other. Thus, according to The Equal Pressure Principle, the invasion of rain water into the mullion may be almost totally prevented. If the rain water, with kinetic energy being created by the gale-force winds, enters into the space A through the intake ports 36, such rain water can be prevented from further entering into the space B by the auxilial wall 32 and the body wall 28 of the extra bead 26, and goes down into the catch pan 25 along the auxilial wall 32 and the body wall 28. The rain water also goes down through the horizontal space C of the transom 2, the drain ports 23, the small space D and the drain ports 24, and is finally expelled to the atmosphere outside the curtain wall.

Figure 2A:
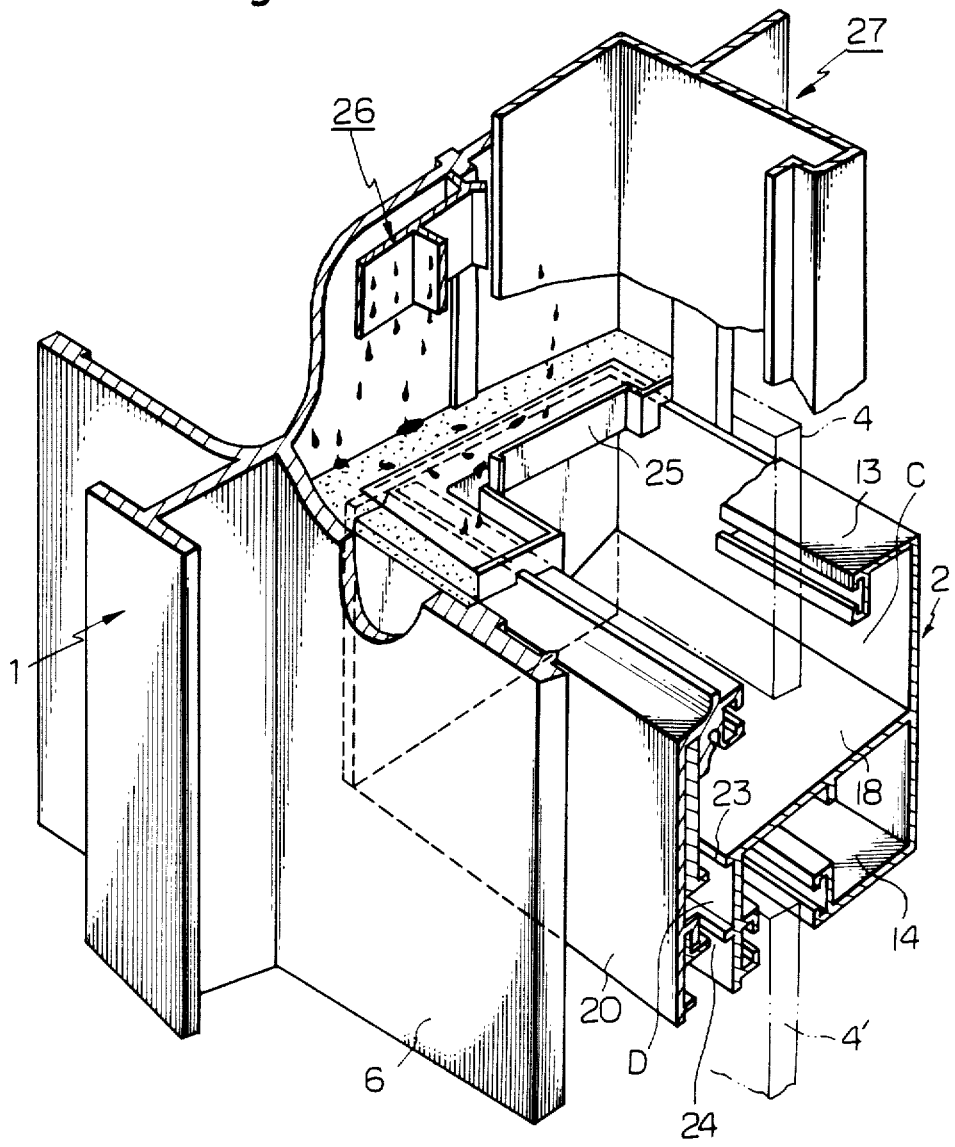
FIG. 2A is a pertial perspective view of FIG. 2.

As shown in FIG. 2A, when water droplets like fog enter into the second space B through the intake ports (36 and 37), such fine water droplets being intangible in the space A, they hit the bead 27 and the auxilial wall (31, 33) of the extra bead and go down into the catch pan 25. Then such water droplets go down through the horizontal space C, the drain ports 23, the space D and the drain ports 24, and are finally expelled to the atmosphere outside the curtain wall. Therefore, there is no risk of the water droplets hitting the tightening compounds (16, 39) provided in the curtain wall.

If desired, said first and second vertical spaces (A, B) can be manufactured into a single vertical space, and the previously described bead 27 may be integrated into the mullion 1.

Figure 5:
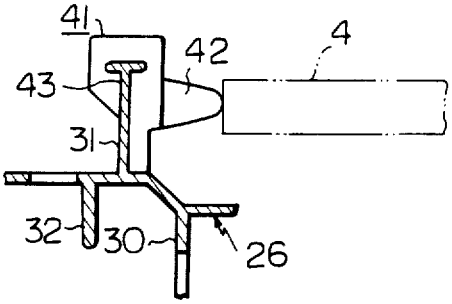
FIG. 5 is an enlarged front view of the guide block for the panel, but positioned within the extra bead.
Figure 5A:
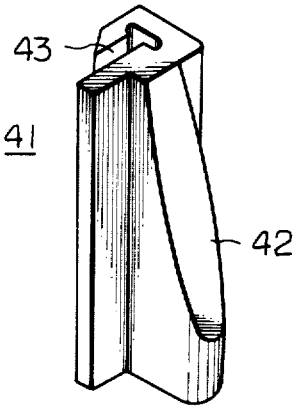
FIG. 5a is a perspective view of the guide block for the panel.

As shown in FIGS. 5 and 5a, guide blocks (41, 44) made, for example, from plastic material are inserted between the bottom portions of the opposed extra beads 26 and the panel 4. Said guide blocks 41 have an elongated body portion. The body portion is provided with an inclined face 42 for receiving the panel 4 thereupon, and with a mounting groove 43 longitudinally extending therein. Thereby, when the groove 43 is mounted on the auxilial wall 31 the inclined face 42 of the guide block 41 is faced toward the panel 4. As a result of the above, the panel 4 being slid down between the guide blocks (41, 41) will automatically take a neutral position. Additionally, said guide blocks (41, 41) play a role in preventing the lateral movement of the panel, caused by the shock of an earthquake or the like.

Figure 6:
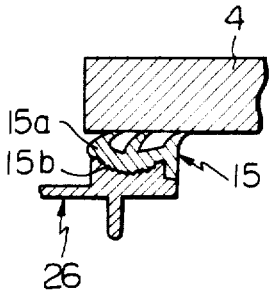
FIG. 6 is an enlarged cross-sectional view of the tightening compound showing the condition said tightening compound contacts with the panel.

As shown in FIG. 6, a tightening compound 15 is made by resilient material, for example, synthetic rubber or plastic having a curved body portion and a plurality of legs 15a protruding from said body portion. Said curved surface of the tightening compound 15 is engaged by the notched depressed face 15b of the extra bead 26 so as to create a firm engagement with each other.

Figure 7:
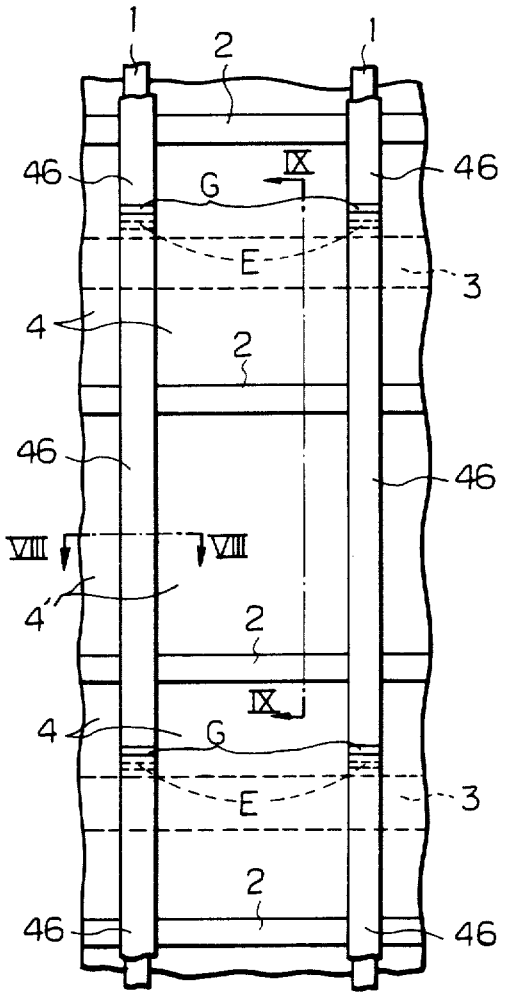
FIG. 7 is a partial front view showing another embodiment of the present invention.
Figure 8:
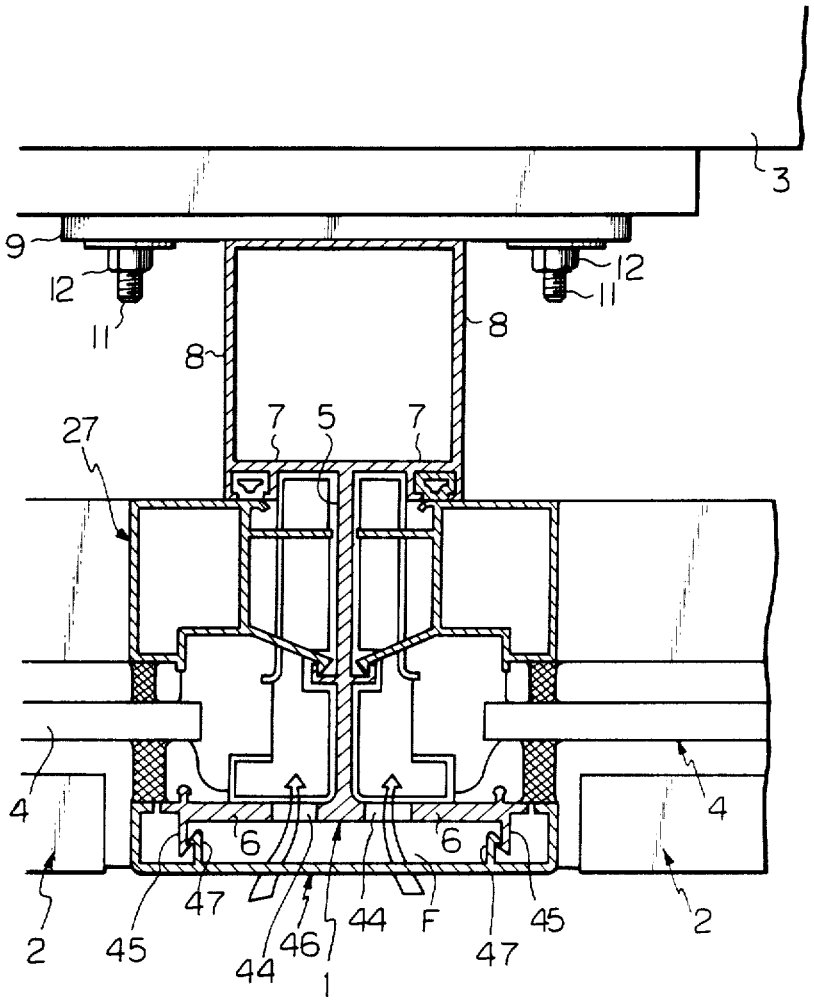
FIG. 8 is an enlarged cross-sectional view taken substantially on line VIII—VIII of FIG. 7.
Figure 9:
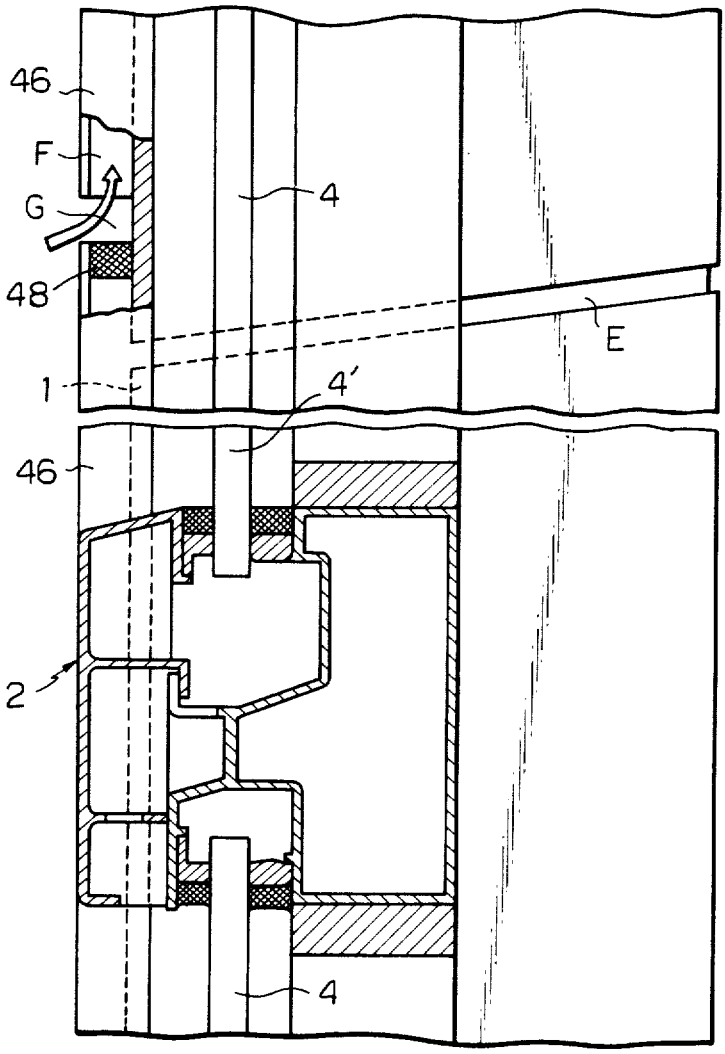
FIG. 9 is an enlarged cross-sectional view taken substantially on line IX—IX of FIG. 7.

FIGS. 7, 8 and 9 showing another embodiment of the present invention wherein the mullions (1, 1 . . . ) manufactured in unit length, for example in 3 meters, are spaced apart with small gaps in the longitudinal direction of the mullions. In FIG. 7 said gaps are shown as E. Intake ports (44, 44) for the open air are formed on the outer surface of the exterior flanges (6, 6) of the mullion 1. As shown in FIG. 8, said outer surface is exposed to the open air outside the curtain wall. Hook-shaped engaging plates (45, 45) are outwardly protruded from the ends of said outer surface of the exterior flanges (6, 6). A flat channel-shaped cover plate 46 has an elongated body portion which covers the overall width of said outer surface of the exterior flanges and longitudinally extending hook-shaped engaging legs (47, 47) inwardly protrude therefrom. This permits the engaging legs (47, 47) of the cover plate 46 to be snapped into and locked with the engaged plates (45, 45) of the mullion 1. Thus, an elongated vertical passage F is formed between the outer surface of the mullion 1 and the cover plate 46. Said cover plate 46 is used to cover the intake ports (44, 44). Although the intake ports (44, 44 . . . ) may be provided in each mullion 1 at a suitable position and in suitable numbers, two intake ports are illustrated at the middle portion of the mullion 1 depicted in FIG. 8.

According to the embodiment illustrated in FIGS. 7, 8 and 9, the cover plates (46, 46 . . . ) are spaced apart with small gaps G in the longitudinal direction of the cover plate 46. The elongated vertical passage F is closed at its upper end by a blocking member 48 so as to keep off the invasion of the rain water into said passage F, while the lower end of the passage F is opened so as to connect the intake ports (44, 44) with the open air outside the mullion 1. In addition, the positions of small gaps (G, G . . . ) are offset from that of the small gaps (E, E . . . ) in the vertical direction. Therefore, the invasion of rain water through gap E can be prevented.

What is claimed is:

1. A flashing construction for a curtain wall having a plurality of vertical mullions disposed parallel to each other at a predetermined distance and panels being mounted between adjacent mullions, said flashing construction comprising:

a vertical mullion *having interior and exterior flanges, said mullion being* provided with a mounting groove at each side thereof for receiving [one] *the* side portion [on] *of* the panel;

[an enclosed vertical space formed between said mounting groove and the side portion of the panel, said vertical space being extended in the longitudinal direction of the mullion, and said vertical space being connected to the open air outside the mullion;]

[an extra] bead *means* for the mullion [, said extra bead being] disposed [in said mounting groove at the outermost position therein,] *between said interior and exterior flanges* so as to form a narrower mounting groove therebetween for receiving [another] *the* side portion of the panel, *said bead means including an exterior bead;*

*an enclosed vertical space formed between said exterior flange and said exterior bead, said vertical space being extended in the longitudinal direction of the mullion, and said vertical space being connected to the open air outside the mullion; and* another enclosed vertical [spaced] *space* formed between said narrower groove and the [other] side portion of the panel, said other vertical space being extended in the longitudinal direction of the mullion, and said [extra] *means* being provided with intake ports, whereby said other vertical space is connected to the open air outside the mullion.

2. A flashing construction for a curtain wall having a plurality of vertical mullions disposed parallel to each other at a predetermined distance and panels being mounted between [adjacent] adjacent mullions, said flashing construction comprising:

a vertical mullion provided with a mounting groove at each side thereof for receiving the side portion of the panel;

an enclosed vertical space being formed between said groove and the side portion of the panel, said vertical space being extended in the longitudinal direction of the mullion, and said vertical space being connected to the open air outside the mullion;

intake ports to the open air provided on the outer surface of the mullion, so as to connect said vertical space with the open air; and, a cover plate for concealing said intake ports exposed to the open air, thereby preventing rain from blowing through said intake ports.

3. A flashing construction as claimed in claim 2 in which said cover plate is made in the form of an elongated channel having a groove thereof facing the outer surface of the mullion, and in which, between the inner surface of the cover plate and the outer surface of the mullion, is provided a passage for air, said passage for air being closed at its upper end and opened at its lower end.

4. A flashing construction as claimed in [claims 2 or 3] *claim 2* including a plurality of mullions being connected with each other along a vertical direction, and in which a plurality of said cover plates are spaced apart with small gaps from each other along a vertical direction, each of said gaps being offset from the places corresponding to the connecting points of the mullions, so as not to coordinate said gaps with said connecting points.

5. A flashing construction for a curtain wall having a plurality of vertical mullions disposed parallel to each other at a predetermined distance, a plurality of horizontal transoms perpendicularly [connecting] *connected* between said adjacent mullions and disposed parallel to each other, and panels being mounted between said adjacent mullions and transoms, said flashing construction comprising:

a vertical mullion *having interior and exterior flanges, said mullion* being provided with a mounting groove at each side thereof;

[an extra] *a* bead being disposed in said groove [at the outermost position therein, as well as a] *inside said interior flange, and an extra bead being disposed* [is] *in* said groove [at the innermost position therein,] *inside said exterior flange* so as to form a narrower mounting groove therebetween for receiving the said portion of the panel;

an enclosed vertical space with intake ports to the open air being formed amoung said extra bead, the mullion, the bead and the panel; [and comprising:]

a horizontal transom being provided with mounting grooves at the upper and the lower sides thereof for receiving the end portions of the panel;

an enclosed horizontal space extending through the inside of said horizontal transom;

drain ports for rain water being downwardly provided in the horizontal transom so as to connect said horizontal space with the open air outside the transom; *and*

[whereby,] *connection means for connecting* said vertical space in the vertical mullion and said horizontal space in the horizontal transom [are connected] with each other at their respective ends.

6. A flashing construction as in claim 5 in which said vertical space is divided into a first and a second vertical spaces, the first vertical space being provided with intake ports, said first and second spaces being connected with each other through connecting ports.

7. A flashing construction as claimed in claim 5 in which said drain ports for the rain water act as the intake ports for introducing open air into the horizontal space.

8. A flashing construction [is] *as* claimed in claim 5 [and 6] in which said extra bead is provided with supplemental walls forming labyrinths thereupon, which prevents the rain from blowing through the intake ports.

9. A flashing construction as claimed in claim 5 in which said horizontal transom is fitted inside the mounting groove which is provided at each side of the vertical mullion.

10. A flashing construction as claimed in claim 5 in which said panel is *a* window sash.

*11. A flashing construction as claimed in claim 3 including a plurality of mullions being connected with each other along a vertical direction, and in which a plurality of said cover plates are spaced apart with small gaps from each other along a vertical direction, each of said gaps being offset from the places corresponding to the connecting points of the mullions, so as not to coordinate said gaps with said connecting points.*

*12. A flashing construction as claimed in claim 6 in which said extra bead is provided with supplemental walls forming labyrinths thereupon, which prevents the rain from blowing through the intake ports.*

* * * * *